(12) United States Patent
Kobayashi et al.

(10) Patent No.: US 7,505,084 B2
(45) Date of Patent: Mar. 17, 2009

(54) PICTURE QUALITY IMPROVEMENT DEVICE AND PICTURE QUALITY IMPROVEMENT METHOD

(75) Inventors: Michio Kobayashi, Tokyo (JP); Eifu Nezu, Tokyo (JP); Reiichi Kobayashi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 675 days.

(21) Appl. No.: 11/258,154

(22) Filed: Oct. 26, 2005

(65) Prior Publication Data

US 2006/0098122 A1 May 11, 2006

(30) Foreign Application Priority Data

Oct. 27, 2004 (JP) ............................. 2004-312263

(51) Int. Cl.
*H04N 5/21* (2006.01)
(52) U.S. Cl. ...................................... 348/625; 348/630
(58) Field of Classification Search ................. 348/625, 348/630, 712, 713, 606, 627, 631, 252, 253; 382/254, 266, 269, 275; *H04N 5/21, 5/208, H04N 9/77, 9/64*
See application file for complete search history.

(56) References Cited

U.S. PATENT DOCUMENTS 5,404,180 A * 4/1995 Kitano et al. ................ 348/625
7,391,476 B2 * 6/2008 Hahn .......................... 348/625

FOREIGN PATENT DOCUMENTS

| JP | 01-246984 | 10/1989 |
| JP | 01-246985 | 10/1989 |
| JP | 08-70332 | 3/1996 |
| JP | 2570001 | 10/1996 |
| JP | 08-331583 | 12/1996 |

\* cited by examiner

*Primary Examiner*—Sherrie Hsia
(74) *Attorney, Agent, or Firm*—McGinn IP Law Group, PLLC

(57) ABSTRACT

An average value signal of the G two-phase input signal is generated by means of an average value calculation circuit. This average value signal is regarded as a signal in which a one-dimensional low-pass filter process, in which the number of taps is 2 and the filter coefficient for each tap is 0.5, has been carried out for a single-phase signal and the number of items of data then thinned to one half. A two-dimensional LPF circuit next subjects this average value signal to a low-pass filter process to eliminate the high-frequency component (edge component). The average value signal that has undergone the low-pass filter process is then subtracted from the input signal of each phase to extract the edge component of the input signal of each phase. An amplification circuit then multiplies the edge component of the input signal of each phase by a prescribed factor, and an addition circuit next adds this multiplied edge component to the input signal of each phase. The above-described processes emphasize the edges of a video picture that is realized by a two-phase signal and thus realize flare correction.

9 Claims, 5 Drawing Sheets

PICTURE QUALITY IMPROVEMENT DEVICE AND PICTURE QUALITY IMPROVEMENT METHOD

BACKGROUND OF THE INVENTION

1. Field of the Invention

The present invention relates to a picture quality improvement device of video signals and a picture quality improvement method of video signals.

2. Description of the Related Art

In an image display device such as a television image receiver or video projector, picture quality is known to deteriorate due to the occurrence of flare. Flare is a phenomenon in which the reflection or scattering of light on the irradiation surface or lens of a picture receiving tube or projector tube causes the intrusion of light of a bright area into the light of a dark area, thereby producing the blurring of edges at which the differences in the luminance of a displayed image are great (for example, at the borders of white regions and black regions).

To correct this type of flare, image processing is carried out to emphasize edges having large differences in luminance in a displayed image. Referring to FIG. 1, a block diagram is shown that shows an example of the configuration of a picture quality improvement device of the prior art for correcting flare by an image process for emphasizing edges (Refer to JP-A-H01-246984 (Patent Document 1) or JP-A-H01-246985 (Patent Document 2)). In FIG. 1, image processing is carried out to emphasize edges for the G signal of RGB (Red, Green, and Blue) signals.

In FIG. 1, G input signal (Gin) is supplied as input to delay compensation circuit 22 and two-dimensional low-pass filter (LPF) circuit 23. Delay compensation circuit 22 is a circuit for delaying the input signal the time required for the processing of two-dimensional LPF circuit 23 (the same being true of delay compensation circuit 21 and delay compensation circuit 27). Two-dimensional LPF circuit 23 is a filter for eliminating from the input signal frequency components (such as edge components) that are higher than a prescribed frequency. Two-dimensional LPF circuit 23 is made up from, for example, a delay circuit, an amplification circuit, and an addition circuit; and eliminates the high-frequency component of the input signal by replacing the data of a particular picture element with, for example, the weighted average of data of a plurality of adjacent picture elements (refer to Patent Document 2).

Due to the elimination of the high-frequency component of the G input signal that is applied as input to two-dimensional LPF circuit 23, a signal in which edges are dulled is supplied as output from two-dimensional LPF circuit 23 (refer to the waveform shown in FIG. 1). The G input signal that has been delayed by delay compensation circuit 22 a time interval that corresponds to the processing time of two-dimensional LPF circuit 23 and a signal in which edges have been dulled that is supplied as output from two-dimensional LPF circuit 23 are applied as input to subtraction circuit 24. Subtraction circuit 24 supplies as output a signal in which the latter signal is subtracted from the former signal. Accordingly, subtraction circuit 24 supplies as output a signal in which the high-frequency component (edge component) that was eliminated by two-dimensional LPF circuit 23 has been extracted. Amplification circuit 25 multiplies the signal in which the high-frequency component has been extracted by a prescribed factor and supplies this signal to addition circuit 26. Addition circuit 26 adds the signal in which the high-frequency component has been extracted, that has been multiplied by a prescribed factor, and that has been supplied as output from amplification circuit 25, to the G input signal that is supplied from delay compensation circuit 22. As a result, the G output signal (Gout) is a signal in which the edge component of the G input signal has been emphasized. The above-described process thus realizes flare correction.

In the foregoing explanation, flare correction is carried out only for the G signal because, of the RGB signals, flare correction in the G signal has the greatest effect on picture quality improvement. Obviously, flare correction may also be carried out not only for the G signal but for the R signal and B signal as well. Flare correction may also be carried out for the Y (luminance) signal and the color difference signal (in which case, flare correction for the Y signal has a greater effect on picture quality improvement).

The foregoing explanation concerned a case in which the input signal was transmitted by a single phase, but when a large amount of information is transmitted in the signal, and particularly for RGB data, the input signal is transmitted in two phases (the signal is not often transmitted in two phases for Y data or for color difference data). In the following explanation, a signal that is transmitted in two phases is referred to as a "two-phase signal."

Referring to FIG. 2, a schematic diagram is shown for explaining a two-phase signal. In a two-phase signal, a first-phase data string s1, s2, s3, . . . and a second-phase data string t1, t2, t3, . . . are transmitted at the same clock, as shown in FIG. 2 (showing the case for a one-dimensional video signal). Data sn is the data of the picture element that is interposed between the picture element of data tn−1 and the picture element of data tn. In other words, the data of adjacent picture elements are distributed in order to different phases.

When the input signal is a two-phase signal, flare correction cannot be carried out for each phase independently due to the extremely low accuracy of the extraction of high-frequency components by means of the two-dimensional LPF circuits and subtraction circuits, even when flare correction is carried out for each phase independently.

Thus, in order to carry out flare correction when the input signal is a two-phase signal, the most straightforward approach is to adopt a configuration in which the two-phase signal is multiplexed as a one-phase signal (data of the second phase are inserted into data of the first phase. In the example of FIG. 2, this insertion would yield the data string: s1, t1, s2, t2, s3, t3, . . . ), flare correction carried out by means of a picture quality improvement device of the prior art, and the output signal then resolved to a two-phase signal (the data of adjacent picture elements are distributed in order to different phases). FIG. 3 is a block diagram showing the configuration of a picture quality improvement device for a case in which the input signal is a two-phase signal. The input two-phase signals for R, G, and B are applied as input to multiplexers MUX31, MUX32, and MUX33, respectively, and multiplexed. Flare correction is then carried out for the multiplexed single-phase signals (flare correction is performed for only the G signal in FIG. 4), following which the single-phase signals are each resolved to two-phase signals in demultiplexers DEMUX 34, DEMUX 35, and DEMUX 36 and then supplied as output.

In the picture quality improvement device of FIG. 3, flare correction is carried out for a single-phase signal that has been multiplexed, and the elements from MUX to DEMUX must therefore be operated at a clock frequency that is twice the clock frequency of the two-phase signal. However, the original reason for transmitting by a two-phase signal was the excessive clock frequency required for transmission by a single-phase signal. Carrying out flare correction for the multiplexed single-phase signal therefore demands high-speed operation in the elements between the MUX and the DEMUX, and in particular, the two-dimensional LPF circuits, and consequently imposes a great load upon these elements.

SUMMARY Of THE INVENTION

It is an object of the present invention to provide a picture quality improvement device that can perform flare correction at the clock frequency of the two-phase signal without changing frequency and that consequently does not subject elements such as the two-dimensional LPF circuits to excessive load.

To achieve the above-described object in the picture quality improvement device of the present invention, an average value signal of a two-phase signal (when expressed according to the example of FIG. 2, a signal with the data string (s1+t1)/2, (s2+t2)/2, (s3+t3)/2, . . . ) is generated, a two-dimensional low-pass filter process is carried out for this average value signal, and frequency components having frequencies that are higher than a prescribed frequency (such as edge components) are eliminated. The data string of the average value signal that has been subjected to this two-dimensional low-pass filter process is then subtracted from the data string of each phase that has been supplied as input to generate a signal in which the high-frequency component of each phase has been extracted. The data string of the signal in which the high-frequency component has been extracted is then multiplied by a prescribed factor for each phase and added to the data string of each phase that has been supplied as input. By the above-described process, the edges of the image produced by a two-phase signal are emphasized, and flare correction is thus realized.

The generation of an average value signal of a two-phase signal corresponds to carrying out one type of one-dimensional low-pass filter process upon a single-phase signal that is obtained by multiplexing the two-phase signal (when expressed according to the example of FIG. 2, a signal that takes s1, t2, s2, t2, s3, t3, . . . as the data string) and then thinning out to one-half the number of data items. The high-frequency component (edge component) that is extracted by carrying out the two-dimensional low-pass filter process upon the data string of the average value signal and then subtracting the resulting data string from the data string of each phase therefore has far greater accuracy than a high-frequency component that is extracted from each phase separately. This high level of accuracy is obtained because the high-frequency component is extracted from truly representative data of each phase.

In the present invention, moreover, the generation of the average value signal of the two-phase signal results in the performance of a type of one-dimensional low-pass filter process before the two-dimensional low-pass filter process is carried out, but this does not present a serious problem because the cutoff frequency realized by generating the average value signal of the two-phase signal is believed to generally surpass the cutoff frequency that is realized by the two-dimensional low-pass filter process.

As described in the preceding explanation, the picture quality improvement device according to the present invention performs edge-emphasizing image processing for the purpose of flare correction using a two-phase signal without alteration, and each element of the picture quality improvement device may therefore operate at the same clock frequency as the two-phase signal. As a result, elements such as the two-dimensional LPF circuits are not subjected to excessive load.

The above and other objects, features, and advantages of the present invention will become apparent from the following description with reference to the accompanying drawings, which illustrate examples of the present invention.

DETAILED DESCRIPTION Of THE PREFERRED EMBODIMENTS

Figure 4A:
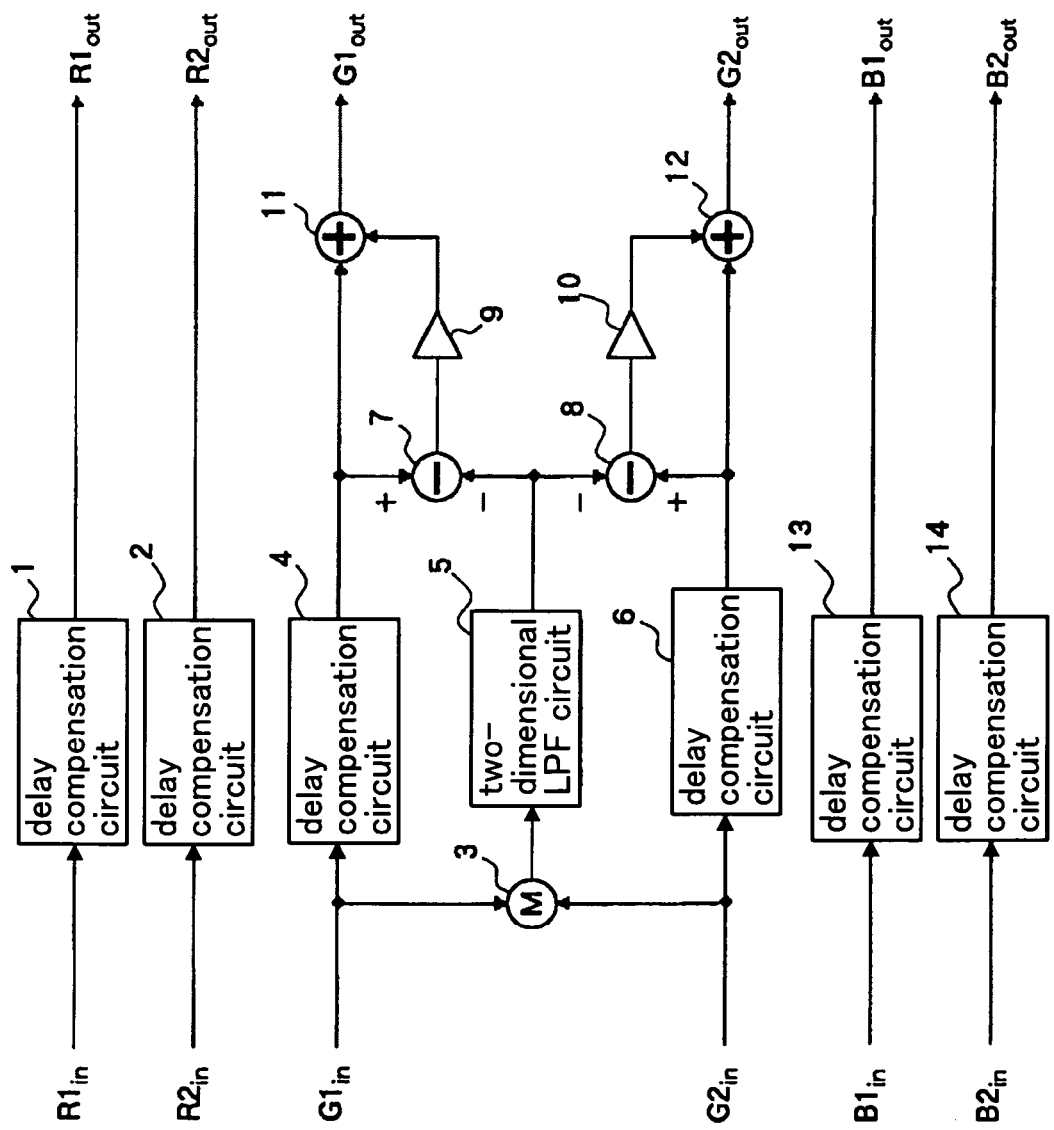
FIG. 4A is a block diagram showing the configuration of a picture quality improvement device according to the present invention for a case in which the input signal is a two-phase signal.
Figure 4B:
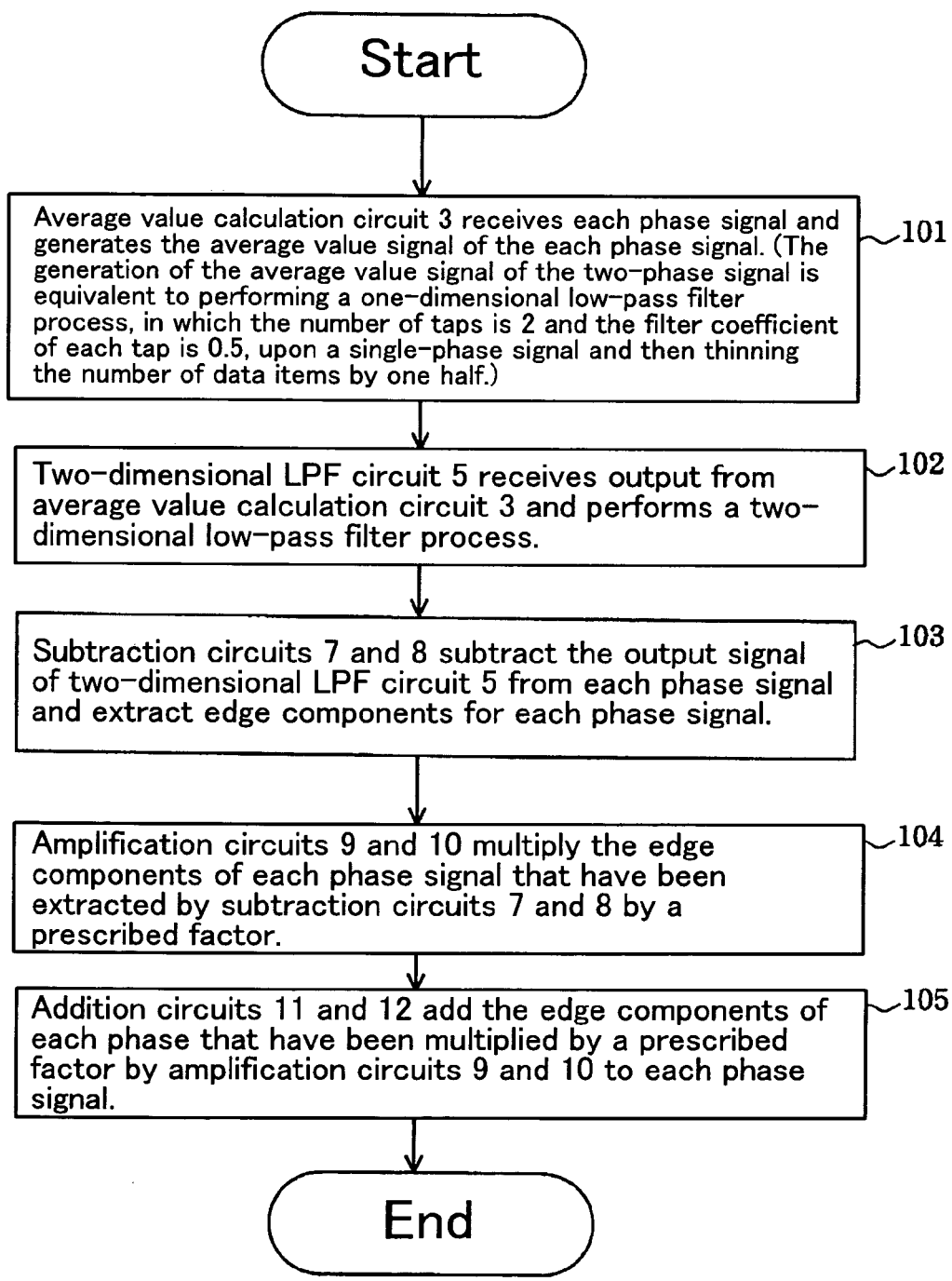
FIG. 4B is a flow chart showing the procedures of the picture quality improvement device of FIG. 4A.

FIG. 4A is a block diagram showing the configuration of a picture quality improvement device according to an embodiment of the present invention. In the picture quality improvement device of FIG. 4A, only the G signal undergoes flare correction. Of course, flare correction may also be carried out not only for the G signal, but for the R signal and B signal as well. Flare correction may also be carried out for the Y signal and the color difference signal as well (carrying out flare correction for the Y signal is more effective for picture quality improvement, but the Y signal and color difference signal are not often transmitted as a two-phase signal.). The following explanation regards the operation of the picture quality improvement device of FIG. 4A with reference to the flow chart of FIG. 4B that shows the procedures of the picture quality improvement device of FIG. 4A.

RGB two-phase signals (R1in, R2in, G1in, G2in, B1in, and B2in) are applied as input to delay compensation circuits 1, 2, 4, 6, 13, and 14, respectively. Delay compensation circuits 1, 2, 13, and 14 delay the input signal by the processing time of average value calculation circuit 3, two-dimensional LPF circuit 5, subtraction circuit 7 or 8, amplification circuit 9 or 10, and addition circuit 11 or 12. Delay compensation circuits 4 and 6 delay the input signal by the processing time of average value calculation circuit 3 and two-dimensional LPF circuit 5.

Figure 1:
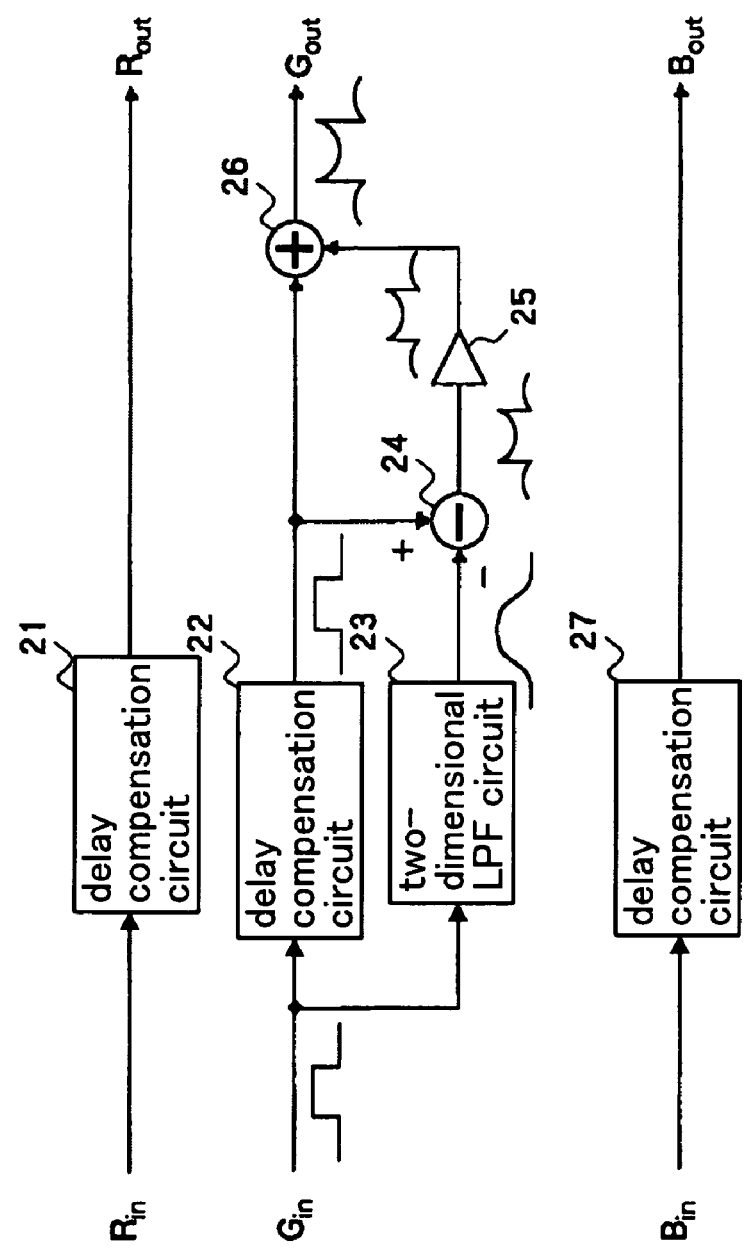
FIG. 1 is a block diagram showing the configuration of a picture quality improvement device of the prior art for a case in which the input signal is a single-phase signal.
Figure 2:
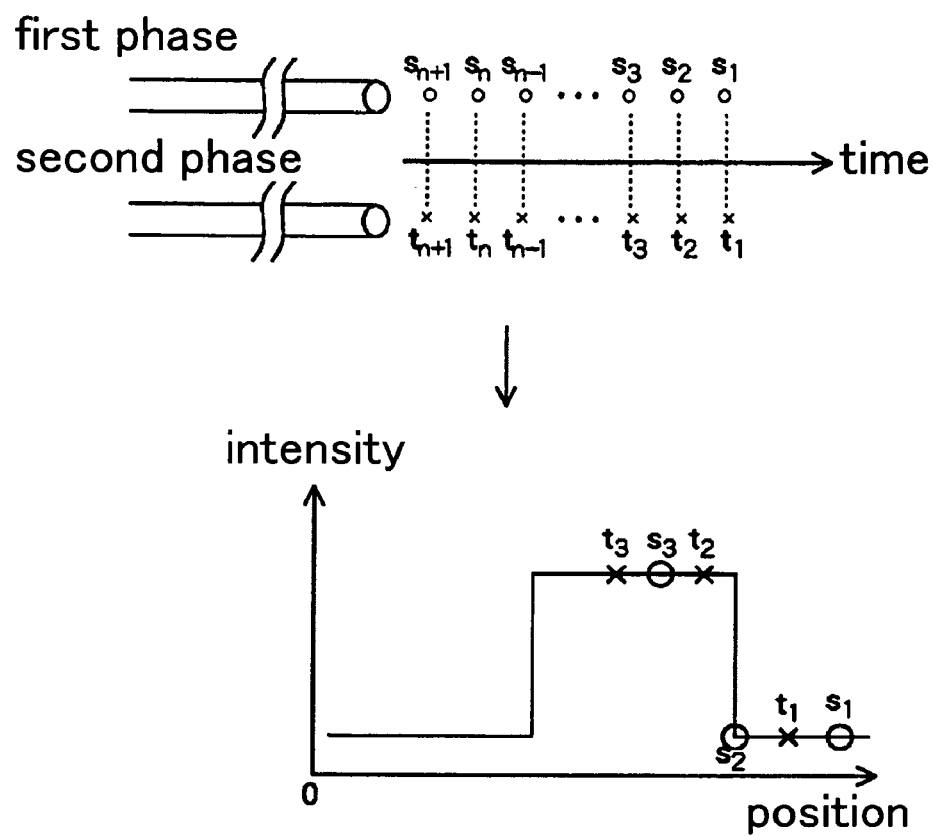
FIG. 2 is a schematic view for explaining a two-phase signal.
Figure 3:
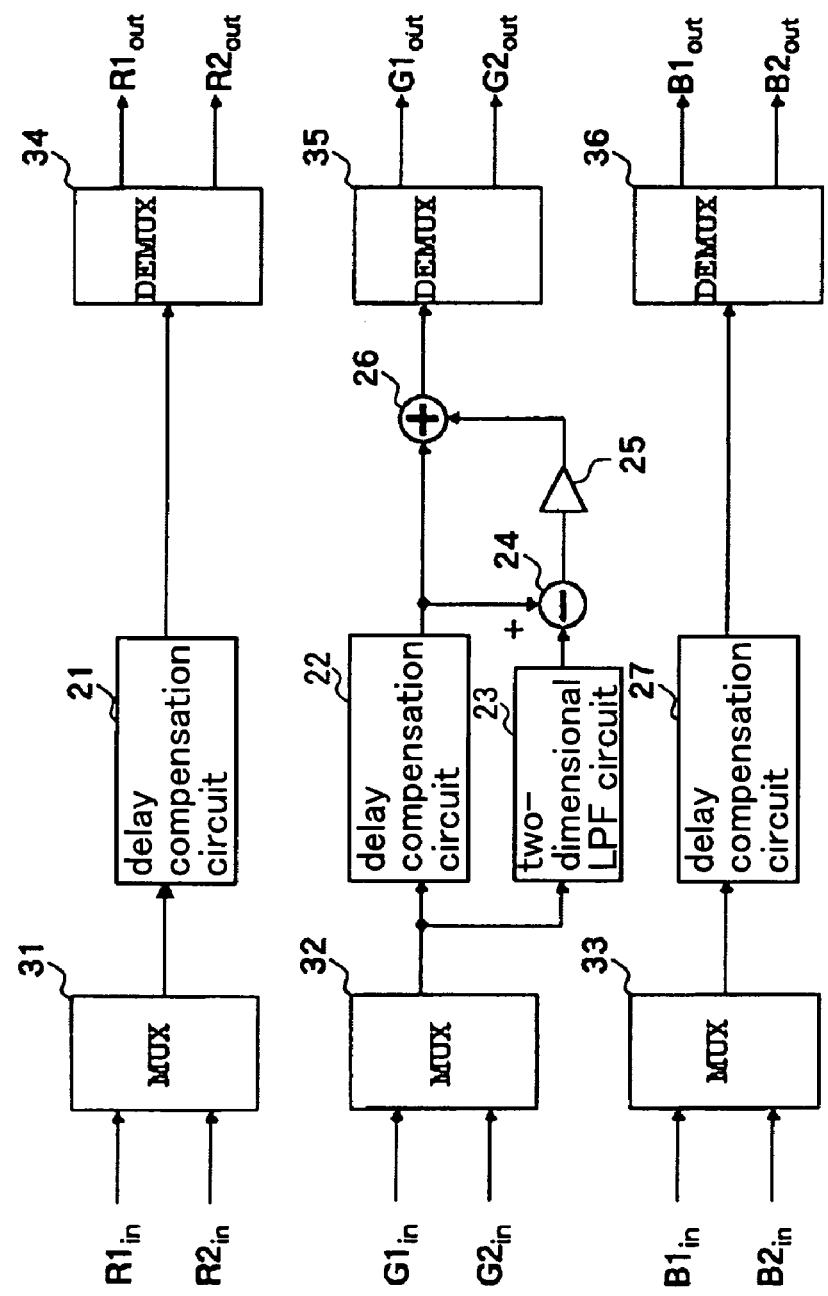
FIG. 3 is a block diagram showing the configuration of a picture quality improvement device of the prior art for a case in which the input signal is a two-phase signal.

The G two-phase input signal (G1in and G2in) is both applied as input to delay compensation circuits 4 and 6 and applied as input to average value calculation circuit 3. Average value calculation circuit 3 generates the average value signal of the G two-phase input signal (G1in and G2in). As explained in FIG. 2, the two-phase input signal G1in and G2in that is applied as input to average value calculation circuit 3 are the data of two adjacent picture elements; and average value calculation circuit 3 is a two-tap one-dimensional LPF circuit and is equivalent to a one-dimensional LPF circuit in which the filter coefficients of the taps are 0.5 and 0.5. In this case, taps are the units for combination of delay circuits and amplification circuits; and the filter coefficients are the amplification rate of these amplification circuits. LPF circuits replace the data of a particular picture element with the weighted average of the data of the number of adjacent picture elements that corresponds to the tap number and that include that picture element; and average value calculation circuit 3 can also be considered to be a variety of this type of LPF circuit (one-dimensional LPF circuit). If the data string of G1$in$ is assumed to be s1, s2, s3, ... and the data string of G2$in$ is assumed to be t1, t2, t3, ..., the data string m1, m2, m3, ... of the average value signal is (s1+t1)/2, (s2+t2)/2, (s3+t3)/2, ... (Step 101).

The average value signal that is supplied as output from average value calculation circuit 3 is applied as input to two-dimensional LPF circuit 5. Two-dimensional LPF circuit 5 performs a two-dimensional low-pass filter process upon the average value signal and eliminates frequency components that are higher than a prescribed frequency, whereby the edge component of the average value signal is eliminated. The data string of the output signal of two-dimensional LPF circuit 5 is 11, 12, 13, ... (Step 102).

The output signal of two-dimensional LPF circuit 5 is subtracted by subtraction circuits 7 and 8 from two-phase input signals G1$in$ and G2$in$ that have been delayed by delay compensation circuits 4 and 6, respectively, whereby the high-frequency components (edge components) are extracted for each phase of the two-phase input signal G1$in$ and G2$in$, respectively. The data string u1, u2, u3, ... of the output signal of subtraction circuit 7 is (s1−11), (s2−12), (s3−13), ... ; and the data string v1, v2, v3, ... of the output signal of subtraction circuit 8 is (t1−11), (t2−12), (t3−13), ... (Step 103).

The edge components of each phase that have been extracted by subtraction circuits 7 and 8 are each multiplied by a prescribed factor by amplification circuits 9 and 10. The data string w1, w2, w3, ... of the output signal of amplification circuit 9 is $\alpha$u1, $\alpha$u2, $\alpha$u3, ... (where $\alpha$ is a constant). The data string x1, x2, x3, ... of the output signal of amplification circuit 10 is $\beta$v1, $\beta$v2, $\beta$v3, ... (where $\beta$ is a constant) (Step 104).

The edge components of each phase that have been multiplied by a prescribed factor are added to the original G two-phase input signal (G1$in$ and G2$in$) by addition circuits 11 and 12, respectively, whereby the edges are emphasized. The data string y1, y2, y3, ... of the output signal of addition circuit 11 is (s1+w1), (s2+w2), (s3+w3), ... ; and the data string z1, z2, z3, ... of the output signal of addition circuit 12 is (t1+x1), (t2+x2), (t3+x3), ... (Step 105). Flare correction is realized by means of these steps.

The generation of the average value signal of the two-phase signal is equivalent to performing a one-dimensional low-pass filter process, in which the number of taps is 2 and the filter coefficient of each tap is 0.5, upon a single-phase signal (a signal having the data string s1, t1, s2, t2, s3, t3, ... ) that is obtained by multiplexing this two-phase signal and then thinning the number of data items by one half. The high-frequency components (edge component) that are extracted by performing a two-dimensional low-pass filter process upon the data string of the average value signal and subtracting the result from the data string of each phase have far higher accuracy than high-frequency components that are extracted from each phase separately. This greater accuracy is obtained because the high-frequency components are extracted after first obtaining more representative data of each phase.

In the present invention, moreover, generating an average value signal of a two-phase signal results in performing a type of one-dimensional low-pass filter process before performing the two-dimensional low-pass filter process, but the cutoff frequency that results from generating the average value signal of a two-phase signal is believed to usually surpass the cutoff frequency that results from the two-dimensional low-pass filter process and therefore does not pose a serious problem.

In addition, average value calculation circuit 3 causes the sampling phase to shift by one-half clock (the video image resulting from the average value signal is an image that is shifted by one-half cycle of the picture element because the data that are generated by average value calculation circuit 3 are data that correspond to positions between picture element and picture element of the two-phase signal data). Nevertheless, the two-dimensional low-pass filter process that is further realized by two-dimensional LPF circuit 5 in a succeeding stage reduces differences in signal strength between adjacent picture elements and decreases the importance of the sampling phase. As a result, the effect upon the picture quality improvement capability is small even when handling a signal in which the sampling phase has shifted by one-half clock. Further, the corrected signal is obtained by extracting a high-frequency component by subtraction from the input signal, and the phase of the high-frequency component of the corrected signal therefore coincides with that of the input signal. Accordingly, no serious problem is presented even if the sampling phase of the signal that has been subjected to the two-dimensional low-pass filter process shifts by a one-half clock.

While a preferred embodiment of the present invention has been described using specific terms, such description is for illustrative purposes only, and it is to be understood that changes and variations may be made without departing from the spirit or scope of the following claims.

What is claimed is:

1. A picture quality improvement device that receives as input a two-phase signal in which data of adjacent picture elements are distributed in order to different phases and then transmitted, and that, at a clock frequency of the two-phase signal, emphasizes edges within a video picture; said picture quality improvement device comprising:

a first means for finding average values of data of the same order in data strings of each phase that have been received as input and generating an average value signal that takes the average values as its data string;

a second means for performing a two-dimensional low-pass filter process upon said average value signal and eliminating components having higher frequency than a prescribed frequency;

a third means for subtracting, from said data strings of each phase that have been received as input, the data string of said average value signal from which a high-frequency component has been eliminated and that has been generated by said second means, and for generating, for each phase, a signal in which the high-frequency component has been extracted;

a fourth means for multiplying, by a prescribed factor, the signal in which the high-frequency component of each phase has been extracted and that has been generated by said third means; and a fifth means for adding, to said data strings of each phase that have been received as input, the data string of the signal in which the high-frequency component has been extracted for each phase and that has been multiplied by the prescribed factor by said fourth means.

2. A picture quality improvement device according to claim 1, wherein said two-phase signal is a G signal of an RGB signal.

3. A picture quality improvement device according to claim 1, wherein said two-phase signal is a luminance signal of a luminance/color difference signal.

4. A picture quality improvement device that receives as input a two-phase signal in which data of adjacent picture elements are distributed in order to different phases and then transmitted, and that, at a clock frequency of the two-phase signal, emphasizes edges within a video picture; said picture quality improvement device comprising:
- an average value calculation circuit for finding average values of data of the same order in data strings of each phase that have been received as input and generating an average value signal that takes the average values as its data string;
- a two-dimensional low-pass filter circuit for performing a two-dimensional low-pass filter process upon said average value signal and eliminating components having higher frequency than a prescribed frequency;
- a subtraction circuit for subtracting, from said data strings of each phase that have been received as input, the data string of said average value signal from which a high-frequency component has been eliminated and that has been generated by said two-dimensional low-pass filter circuit, and for generating, for each phase, a signal in which the high-frequency component has been extracted;
- an amplification circuit for multiplying, by a prescribed factor, the signal in which the high-frequency component of each phase has been extracted and that has been generated by said subtraction circuit; and
- an addition circuit for adding, to said data strings of each phase that have been received as input, the data string of the signal in which the high-frequency component has been extracted for each phase and that has been multiplied by the prescribed factor by said amplification circuit.

5. A picture quality improvement device according to claim 4, wherein said two-phase signal is a G signal of an RGB signal.

6. A picture quality improvement device according to claim 4, wherein said two-phase signal is a luminance signal of a luminance/color difference signal.

7. A picture quality improvement method that takes as input a two-phase signal in which data of adjacent picture elements are distributed in order to different phases and then transmitted and that, at a clock frequency of the two-phase signal, emphasizes the edges within a video picture; said picture quality improvement method comprising:
- a first step of finding average values of data of the same order in data strings of each phase that have been received as input and generating an average value signal that takes the average values as its data string;
- a second step of performing a two-dimensional low-pass filter process upon said average value signal and eliminating components having higher frequency than a prescribed frequency;
- a third step of subtracting, from said data strings of each phase that have been received as input, the data string of said average value signal from which a high-frequency component has been eliminated and that has been generated in said second step, and for generating, for each phase, a signal in which the high-frequency component has been extracted;
- a fourth step of multiplying, by a prescribed factor, the signal in which the high-frequency component of each phase has been extracted and that has been generated by said third step; and
- a fifth step of adding, to said data strings of each phase that have been received as input, the data string of the signal in which the high-frequency component has been extracted for each phase and that has been multiplied by the prescribed factor in said fourth step.

8. A picture quality improvement method according to claim 7, wherein said two-phase signal is a G signal of an RGB signal.

9. A picture quality improvement method according to claim 7, wherein said two-phase signal is a luminance signal of a luminance/color difference signal.

* * * * *